US009912626B2

United States Patent
Lim et al.

(10) Patent No.: US 9,912,626 B2
(45) Date of Patent: Mar. 6, 2018

(54) METHOD AND DEVICE FOR TRANSFERRING AND RECEIVING MESSAGE IN ROAMING SYSTEM

(71) Applicant: Samsung Electronics Co., Ltd., Suwon-si, Gyeonggi-do (KR)

(72) Inventors: Han Na Lim, Seoul (KR); Young Kyo Baek, Seoul (KR); Sang Soo Jeong, Suwon-si (KR); Song Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 14/384,479

(22) PCT Filed: Mar. 18, 2013

(86) PCT No.: PCT/KR2013/002206
§ 371 (c)(1),
(2) Date: Sep. 11, 2014

(87) PCT Pub. No.: WO2013/141552
PCT Pub. Date: Sep. 26, 2013

(65) Prior Publication Data
US 2015/0106454 A1    Apr. 16, 2015

Related U.S. Application Data

(60) Provisional application No. 61/612,484, filed on Mar. 19, 2012, provisional application No. 61/614,470, filed on Mar. 22, 2012.

(51) Int. Cl.
*H04L 12/58*    (2006.01)
*H04W 8/02*    (2009.01)
(Continued)

(52) U.S. Cl.
CPC ............ *H04L 51/18* (2013.01); *H04M 15/57* (2013.01); *H04M 15/66* (2013.01);
(Continued)

(58) Field of Classification Search
CPC ....... H04L 51/18; H04M 15/57; H04M 15/66; H04M 15/8038; H04W 8/02; H04W 8/18; H04W 8/20
See application file for complete search history.

(56) References Cited

U.S. PATENT DOCUMENTS 6,311,055 B1    10/2001    Boltz
6,466,786 B1    10/2002    Wallenius
(Continued)

FOREIGN PATENT DOCUMENTS

CN    1878345 A    12/2006
CN    101998357 A    3/2011
(Continued)

OTHER PUBLICATIONS

PacketCable, Security Technical Report, PKT-TR-SEC-V02-061013, Oct. 13, 2006, p. 1-42.*
(Continued)

*Primary Examiner* — Arvin Eskandarnia
*Assistant Examiner* — Gil H. Lee
(74) *Attorney, Agent, or Firm* — Jefferson IP Law, LLP

(57) ABSTRACT

A method of transferring and receiving data by a mobility management entity (MME) in a mobile communication system according to an embodiment of the present invention includes receiving, from equipment, a message that includes the address of an XML configuration access protocol (XCAP) and is used to access an Internet packet data network (PDN); checking any one of subscription information on the equipment and a network carrier policy, on the basis of the received message; and delivering a create
(Continued)

session request message to a gateway on the basis of the received message if the equipment is accessible to the PDN as the result of the check, wherein the create session request message includes an indicator that accesses the XCAP server. according to an embodiment, roaming equipment may transfer and receive an XCAP related message. Moreover, as the roaming equipment receives the XCAP related message, the present invention has an effect of being able to prevent undesired traffic due to another data packet from occurring.

6 Claims, 8 Drawing Sheets

(51) Int. Cl.
H04W 8/18 (2009.01)
H04M 15/00 (2006.01)
H04W 8/20 (2009.01)

(52) U.S. Cl.
CPC ......... *H04M 15/8038* (2013.01); *H04W 8/02* (2013.01); *H04W 8/18* (2013.01); *H04W 8/20* (2013.01)

(56) References Cited

U.S. PATENT DOCUMENTS

| | | | | |
|---|---|---|---|---|
| 2004/0029576 A1* | 2/2004 | Flykt | ............... | H04L 63/0869 455/422.1 |
| 2004/0071164 A1* | 4/2004 | Baum | ............... | H04L 29/12018 370/469 |
| 2004/0095932 A1* | 5/2004 | Astarabadi | ......... | H04L 29/1216 370/389 |
| 2004/0185845 A1* | 9/2004 | Abhishek | ............ | H04W 88/08 455/422.1 |
| 2005/0169223 A1 | 8/2005 | Crocker et al. | | |
| 2006/0277406 A1* | 12/2006 | Hashimoto | ........... | H04L 63/029 713/168 |
| 2008/0039104 A1 | 2/2008 | Gu et al. | | |
| 2009/0041033 A1* | 2/2009 | Marucheck | ............ | H04L 12/42 370/400 |
| 2013/0182607 A1* | 7/2013 | Kim | ................... | H04W 76/025 370/254 |
| 2014/0146783 A1* | 5/2014 | Kim | ................... | H04W 76/021 370/329 |
| 2014/0219248 A1* | 8/2014 | Reddiboyana | ........ | H04W 36/14 370/331 |

FOREIGN PATENT DOCUMENTS

| | | | | |
|---|---|---|---|---|
| JP | 2009-514348 A | 4/2009 | | |
| JP | 2010-154079 A | 7/2010 | | |
| WO | 99/18704 A2 | 4/1999 | | |
| WO | 2007/076410 A2 | 7/2007 | | |
| WO | 2011/047716 A1 | 4/2011 | | |
| WO | WO 2011047716 A1 * | 4/2011 | ............. | H04L 12/14 |

OTHER PUBLICATIONS

J. Rosenberg et al., A Framework for Consent-Based Communications in the Session Initiation Protocol (SIP), Sipping Internet-Draft, Oct. 28, 2014, pp. 1-17.
Packetcable, Security Technical Report, PKT-TR-SEC-V02-061013, Oct. 13, 2006, pp. 1-42.
3GPP, 3rd Generation Partnership Project; Technical Specification Group Core Network and Terminals; Extensible Markup Language (XML) Configuration Access Protocol (XCAP) Over the UT Interface for Manipulating Supplementary Services (Release 10), Dec. 2011, pp. 1-17, 3GPP TS 24.623 V10.2.0.
Qualcomm Europe, PS Bearer Handling in Redirection/NACC/CCO based CSFB, 3GPP TSG SA WG2 Meeting #76, Nov. 16-20, 2009, TD S2-097060, XP050397928, San Jose Del Cabo, Mexico.
Alcatel-Lucent, Originating & Terminating Network Information Flows, 3GPP TSG CT WG4 Meeting #54bis, Oct. 10-14, 2011, C4-112274, Hyderabad, India.
Samsung, Filtering CS Paging Without SMS Indicator for SMS Only UE, 3GPP TSG-SA WG2 Meeting #75, Aug. 31, 2009-Sep. 4, 2009, S2-095346, Kyoto, Japan.
3GPP, 3rd Generation Partnership Project; Technical Specification Group Core Network and Terminals; Technical realization of Operator Determined Barring (ODB) (Release 10), 3GPP TS 23.015, Dec. 2010, V10.0.0, Sophia Antipolis, France.
Chinese Office Action dated Jul. 13, 2017, issued in the Chinese Application No. 201380012408.4.

* cited by examiner

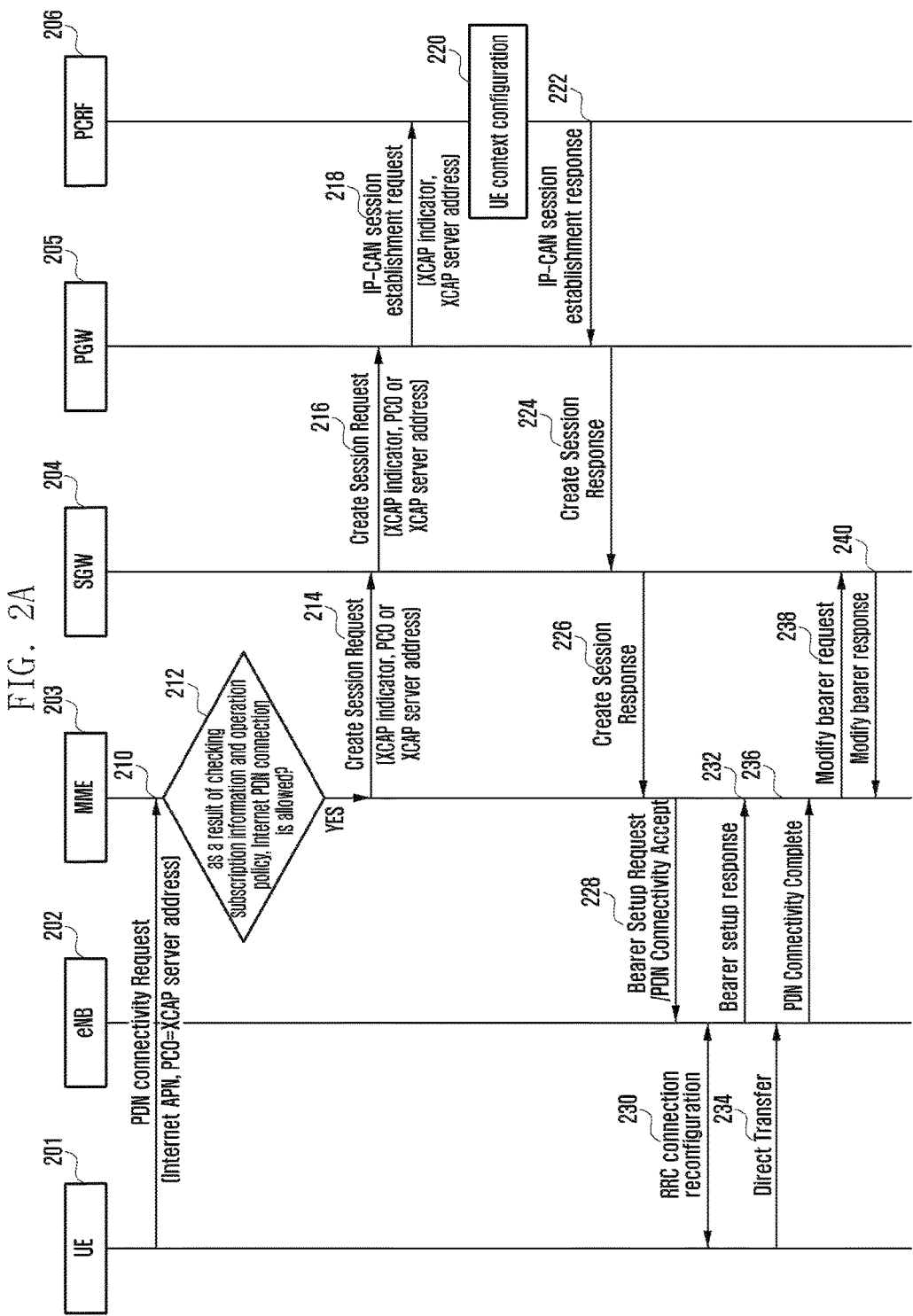

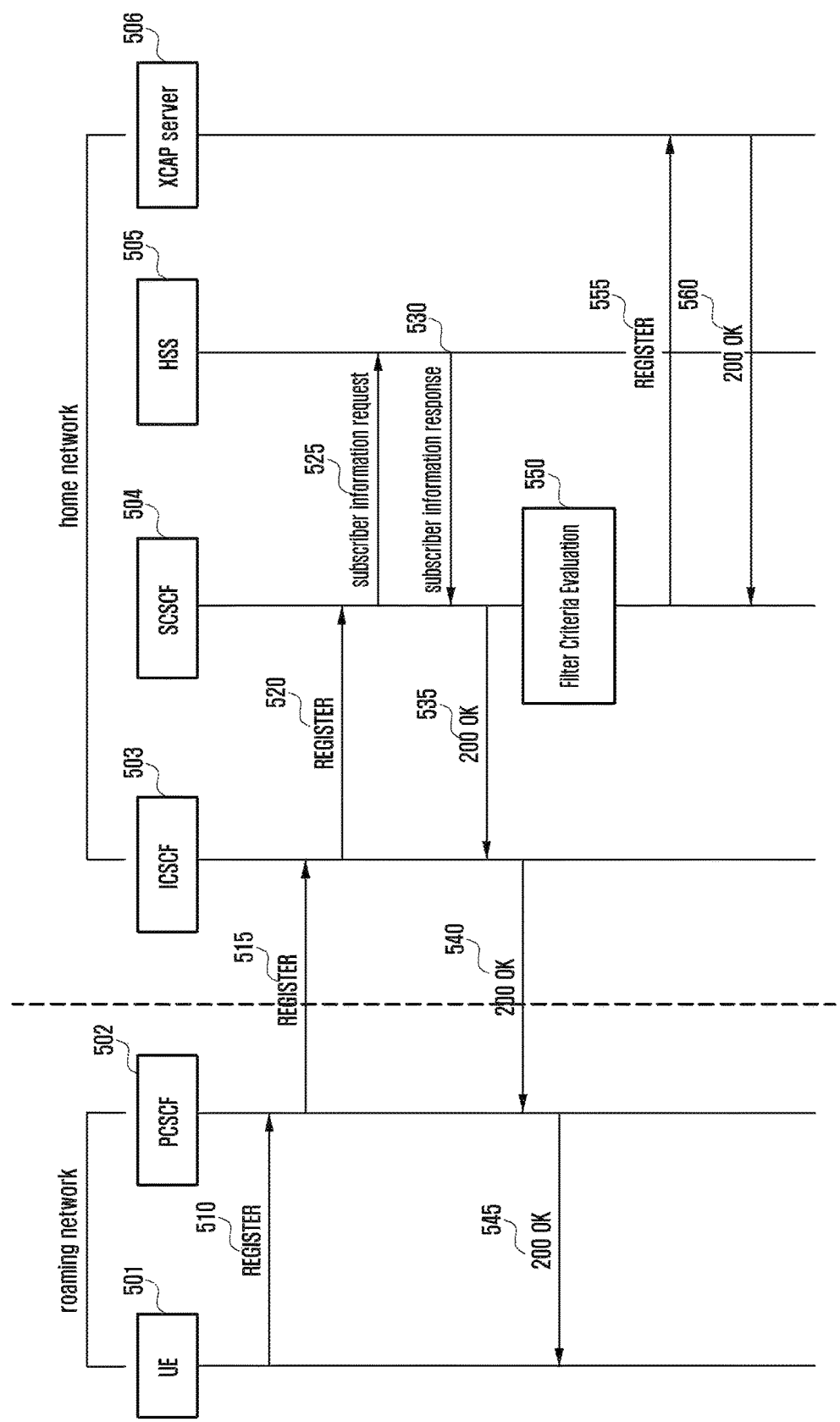

FIG. 7

```
INVITE sip:xcap server sip uri; SIP/2.0                               ─ 710
Via: SIP/2.0/UDP [5555::aaa:bbb:ccc:ddd]:1357;branch=z9hG4bKnashds7
Max-Forwards: 70
Route: <sip:pcscf1.visited1.net:7531;lr>, <sip:scscf1.home1.net;lr>
Accept-Contact: *;+g.3gpp.icsi-ref="urn%3Aurn-7%3gpp-service.ims.icsi.mmtel"
P-Preferred-Identity: "John Doe" <sip:user1_public1@home1.net>
P-Access-Network-Info: 3GPP-UTRAN-TDD; utran-cell-id-3gpp=234151D0FCE11
Privacy: none
From: <sip:user1_public1@home1.net>;tag=171828
To: <sip:xcap server sip uri> ─────────── 720
Call-ID: cb03a0s09a2sdfgikj490333
Cseq: 127 INVITE
Require: sec-agree
Supported: precondition, 100rel, gruu
Proxy-Require: sec-agree
Security-Verify: ipsec-3gpp; q=0.1; alg=hmac-sha-1-96; ealg=aes-cbc; spi-c=98765432; spi-
s=87654321; port-c=8642; port-s=7531
Contact: <sip:user1_public1@home1.net;gr=hdg7777ad7aflzig8sf7>; +g.3gpp.icsi-ref="urn%3Aurn-
7%3gpp-service.ims.icsi.mmtel"
Allow: INVITE, ACK, CANCEL, BYE, PRACK, UPDATE, REFER, MESSAGE, INFO    730
Accept: application/sdp; application/3gpp-ims+xml; application/vnd.3gpp.xcap
Recv-Info: g.3gpp.xcap ──────────── 740
Content-Type: multipart/mixed; boundary=outer
Content-Length: [...]

--outer
Content-Type: application/sdp v=0
o=- 2987933615 2987933615 IN IP6 5555::aaa:bbb:ccc:ddd
s=-
c=IN IP6 5555::aaa:bbb:ccc:ddd
t=0 0
m=audio 0 RTP/AVP 97 96
a=rtpmap:97 AMR
a=fmtp:97 mode-set=0,2,5,7; maxframes=2
a=rtpmap:96 telephone-event          750
--outer
Content-Type: application/vnd.3gpp.xcap

< XCAP MESSAGE > ─── 760

--outer--
```

700

METHOD AND DEVICE FOR TRANSFERRING AND RECEIVING MESSAGE IN ROAMING SYSTEM

TECHNICAL FIELD

The present invention relates to a message communication between entities in a roaming system. In more detail, the present invention relates to a method and apparatus for transmitting an XML Configuration Access Protocol (XCAP) message from a roaming terminal to a home network. Also, the present invention relates to an XCAP message transmission method and apparatus of the terminal barred from accessing an Internet PDN.

BACKGROUND ART

In a typical circuit network, a terminal may use a circuit-level control message to use mandatory supplementary services related to telephony such as caller identification display service and call waiting service.

However, the terminal which allows receiving voice call services through Voice over LTE (VoLTE) in a packet network has to connect to an XML Configuration Access Protocol (XCAP) server to configure such supplementary services. The XCAP standard technology is a technology allowing a client to register application-specific user configuration information with the XCAP server and manage the registered information directly.

The application-specific user configuration information stored in the XCAP server is written in eXtensible Markup Language (XML), and the XCAP client connects to the XCAP server using Hypertext Transfer Protocol (HTTP) 1.1. That is, the VoLTE terminal has to receive an XCAP message to perform IP data transmission other than control message to configure supplementary service configuration.

In an exemplary LTE network, the terminal connects to a Packet Data Network (PDN) with an Access Point Name (APN) configured by the network. The PDN may be an Internet PDN for access to Internet, operator PDN for access to an operator network service, or IP Multimedia Subsystem (IMS) PDN for access to an IMS network service. In the case of VoLTE, it is possible to connect to the IMS PDN through an IMS APN determined by the operator. The VoLTE terminal transmits the call establishment control message, i.e. SIP signaling message, to the IMS PDN and the XCAP message to the Internet PDN.

In the case that the terminal is roaming, it is typical to allow only voice service roaming but not data service roaming. It is also possible to assume a situation where only the voice service is allowed without connection to the data service. In this case, the roaming network allows the connection with the IMS APN of the roaming terminal but not the connection to an Internet APN. That is, although the IMS SIP signal message is delivered to the IMS PDN of the home network, the XCAP message as normal Internet traffic cannot be delivered.

If the roaming network allows connection to the Internet APN for transmitting the XCAP message, this may cause extra Internet traffic in addition to the XCAP message (e.g. automatic updates of Internet connection applications), resulting in unintended cost. There is therefore a need of a method and apparatus allowing a terminal to transmit the message for use in the Internet connection such as XCAP message in an environment in which the terminal cannot connect to the Internet.

DISCLOSURE OF INVENTION

Technical Problem

The present invention has been conceived to solve the above problem and aims to provide a method for allowing a roaming terminal to transmit an XCAP message to the home network.

In more detail, the present invention proposes a method for a roaming terminal to transmit the XCAP message to the home network through an Internet APN/PDN in the roaming state supporting only the voice service but not Internet access among data services. The present invention also proposes a method for delivering the XCAP message to the home network through the IMS APN/PDN.

Solution to Problem

In accordance with an aspect of the present invention, a data communication method of a Mobility Management Entity (MME) of a mobile communication system includes receiving a message for connecting to an Internet Packet Data Network (PDN) including an XML Configuration Access Protocol (XCAP) address from a terminal, checking at least one of subscription information of the terminal and network operator policy based on the received message, and transmitting, when the terminal is allowed for access to the Internet PDN as a result of checking, a Create Session Request message generated based on the received message to a gateway, wherein the Create Session Request message includes an indicator notifying of connection to an XCAP server.

In accordance with another aspect of the present invention, a data communication method of a terminal of a mobile communication system includes transmitting a message for connecting to an Internet Packet Data Network (PDN) to a Mobility Management Entity (MME), the message including an XML Configuration Access Protocol (XCAP) address and performing RRC Connection Reconfiguration with a base station based on the message, wherein the MME checks at least one of subscription information of the terminal and network operator policy based on the received message and transmits, when the terminal is allowed for access to the Internet PDN as a result of checking, a Create Session Request message generated based on the received message to a gateway, the Create Session Request message including an indicator notifying of connection to an XCAP server.

In accordance with another aspect of the present invention, a data communication method of a terminal in a mobile communication system includes determining whether the terminal is allowed to connect to an XML Configuration Access Protocol (XCAP) server, determining, when the terminal is allowed to connect to the XCAP server, whether an address of the XCAP server is stored in the terminal, inserting, when the address of the XCAP server is stored, the address of the XCAP server into a routing table, and locking the routing table to prevent other routing paths from being added to the routing table.

In accordance with another aspect of the present invention, a data communication method of a terminal in a roaming network of a mobile communication system includes transmitting a REGISTER message to a Proxy Call Session Control Function (PCSCF) of the roaming network, receiving a first 200OK message in response to the REGISTER message, and transmitting a message including XML Configuration Access Protocol (XCAP) information to the PCSCF, wherein the message including the XCAP information is one of INVITE message and 'MESSAGE' message, a Serving Call State Control Function (SCSCF) receives subscriber information from a Home Subscriber Server (HSS) based on the REGISTER message, and the 200OK message includes the received subscriber information.

In accordance with another aspect of the present invention, a data communication method of an XML Configuration Access Protocol (XCAP) server in a home network of a mobile communication system includes receiving a REGISTER message transmitted by a terminal which is in a roaming network, the message being relayed by a Serving Call State Control Function (SCSCF), receiving one of an INVITE message and 'MESSAGE' message including XCAP-related information from the terminal, performing an operation indicated by the XCAP-related information included in one of the INVITE message and 'MESSAGE' message, and transmitting the message including an operation result value to the SCSCF.

In accordance with still another aspect of the present invention, a data communication method of a terminal in a roaming network of a mobile communication system includes transmitting one of an INVITE message and 'MESSAGE' message including XCAP-related information and receiving a message including a result value in response to one of the INVITE message and 'MESSAGE' message from an XCAP server.

Advantageous Effects of Invention

The message transmission method and apparatus of the present invention is advantageous in that the roaming terminal is capable of transmitting/receiving XCAP message to/from the home network. Also, the message transmission method and apparatus of the present invention is advantageous in terms of transmitting data without occurrence of unintended traffic caused by other data packet by blocking traffic with the exception of the data between the roaming terminal and the XCAP server.

BRIEF DESCRIPTION OF DRAWINGS

FIG. 2a is a signal flow diagram illustrating a bearer establishment procedure between the UE and the PCRF 150 according to an embodiment.

FIG. 5 is a signal flow diagram illustrating a method of transmitting the information notifying of the delivery of the XCAP message through IMS APN/PDN in the IMS registration procedure of the roaming terminal according to an embodiment.

FIG. 7 is a diagram illustrating a format of the INVITE message according to an embodiment.

MODE FOR THE INVENTION

Exemplary embodiments of the present invention are described with reference to the accompanying drawings in detail. Detailed description of well-known functions and structures incorporated herein may be omitted to avoid obscuring the subject matter of the present invention.

Although the present invention is directed to Evolved Packet System (EPS), it will be understood by those skilled in the art that the present invention can be applied even to other communication systems having the similar technical background, with a slight modification, without departing from the spirit and scope of the present invention.

The present invention proposes two methods for transmitting an XCAP message to the home network through Internet APN/PDN. According to the first embodiment as a protocol level solution, the network checks the subscription information of the terminal or user configuration to configure a packet filter to allow only the XCAP server access through Internet APN/PDN between the terminal and the network. According to the second embodiment as an application level solution, the internal operation of the terminal is modified such that the roaming terminal generates a routing table dedicated for XCAP server connection.

Also, the present invention proposes a method for allowing the roaming terminal to transmit the XCAP message to the home network through the IMS APN/PDN. Also, the present invention proposes a method for allowing the terminal to transmit the XCAP message to the network in a SIP signaling message when it cannot use the Internet APN/PDN.

Although the description is directed to the roaming terminal, the present invention is not limited thereto but can be applied to all the types of terminals capable of connecting IMS PDN or Internet PDN.

According to an embodiment, each entity includes a transceiver for communicating data with another entity and a control unit for controlling the transceiver and operating based on the data transmitted/received through the transceiver.

Figure 1:
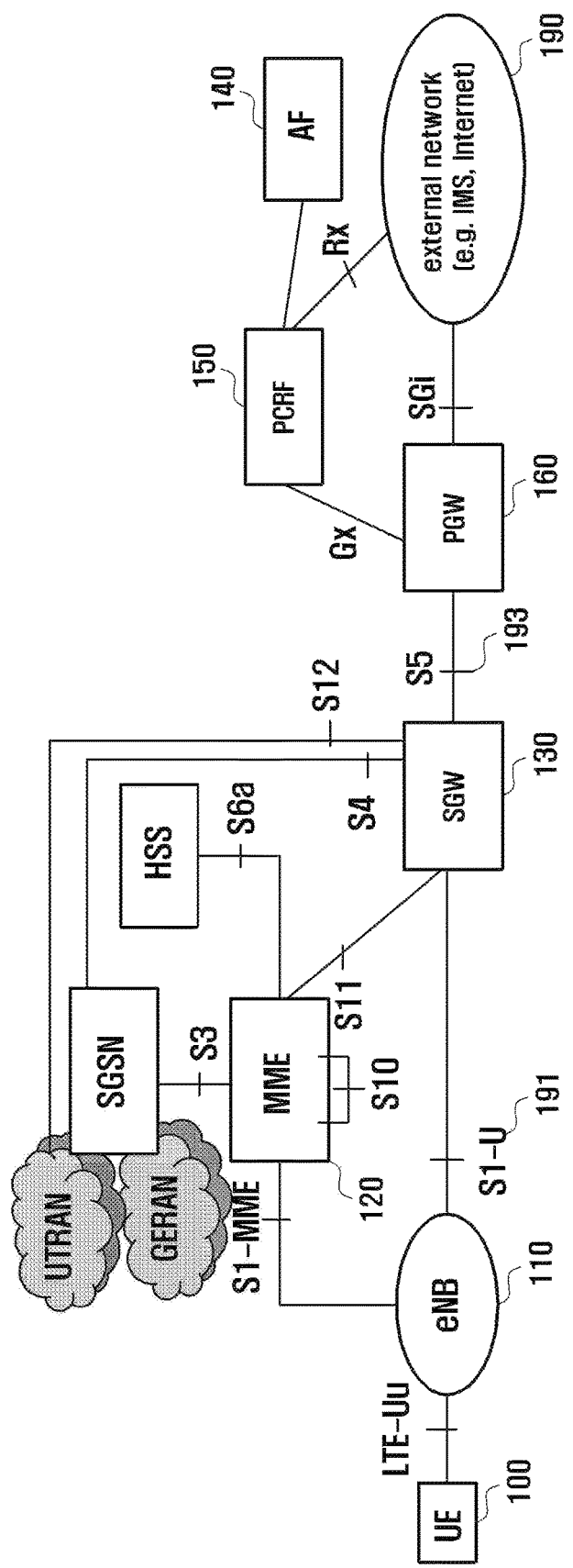
FIG. 1 is a diagram illustrating the architecture of an LTE mobile communication system.

FIG. 1 is a diagram illustrating the architecture of an LTE mobile communication system.

As shown in FIG. 1, the radio access network of the LTE mobile communication system includes Evolved Node B (referred to as E-UTRAN, eNB, and Node B) 10, Mobility Management Entity (MME) 120, and Serving Gateway (S-GW) 130. The User Equipment (UE) 100 connects to an external network 190 through the eNB 110, S-GW 130, and Packet Data Network Gateway (P-GW) 160. The Application Function 140 is an entity for exchanging application information with the user at the application level. The PCRF is a device for controlling user-specific QoS policy, the Policy and Charging Control (PCC) rule is transmitted to the PGW 160 and applied thereto.

The eNB 110 is a Radio Access Network (RAN) node and corresponds to RNC of the UTRAN system and BSC of the GERAN system. The eNB 110 connects to the UE 100 and is responsible for the functions similar to those of the legacy RNC/BSC.

In LTE, all the user traffics including the real time service such as Voice over IP (VoIP) are serviced through the shared channel and thus there is a need of an entity capable of scheduling the user traffic based on the context information of the UEs (100) such as eNB 110.

The SGW 130 is an entity for providing data bearer and establishing or releasing a data bearer under the control of the MME 120. The MME 120 is an entity responsible for various control function and may be connected to a plurality of eNBs.

The Policy Charging and Rules Function (PCRF) 150 is an entity of controlling traffic QoS and billing.

The external network 190 may include networks such as IMS PDN and Internet PDN.

An embodiment proposes two methods for a terminal to transmit an XCAP message to its home network through an Internet APN/PDN.

According to the first embodiment of the present invention, if a roaming terminal connects to a network, the network configures a packet filter to permit only the XCAP server access to the Internet APN/PDN based on the subscription information of the UE or operator configuration, the packet filter being installed in the UE and the network.

In an embodiment, if the UE request for connection to the Internet PDN to receive an XCAP message, Traffic Filter Templates (TFT) are installed on the network along with the packet filter for XCAP connection. In the case of an access for receiving non-XCAP message, the PCRF 150 may reject providing the PCC rule for the packet filter or the UE 100 blocks any request or receipt of a packet filter with the exception of the XCAP connection included in its own TFT.

In EPS, one or more packet filters can be installed in the UE 100 and PGW 160 in the form of TFT. The TFT is generated/modified by the PGW 160 or UE 100 to be transmitted to the UE 100 or PGW 160 through a NAS message in the Attach/Session Creation/Session modification/TAU/Service Request procedure and installed per PDN connection. The packet filter is made up of 5 tuples as follows. According to an embodiment, a packet filter pattern may be designed in the format as follows.

TABLE 1 source IP address or IPv6 network prefix;
destination IP address or IPv6 network prefix;
source port number;
destination port number;
protocol ID of the protocol above IP;

Table 1 shows the packet filter pattern according to an embodiment. The source IP address or IPv6 network prefix denotes the IP address of the transmit UE, and the source port number of the port number of the transmit UE. The destination IP address or IPv6 network prefix and the destination port number are the IP address and port number of the receiver. The protocol ID of the protocol above IP denotes the IP version.

The packet filter is responsible for mapping the IP data to the bearer of a specific PDN in uplink/downlink. According to an embodiment, the packet filter may operate in the UE 100 and PGW 160.

A description is made with an exemplary packet filter in uplink according to an embodiment. Suppose that the packet filter installed at the UE 100 is in the form of (111.111.111.111, 79, 222.222.222.222, 80, IPv4) and the IP data passed the packet filter is mapped to the default bearer of the Internet PDN. Assuming the source IP address of the IP data to be transmitted by the UE 100 is 111.111.111.111, the source port number of the used application is 79, the server address to access is 222.222.222.222, and the destination port number is 80; the IP data is transmitted on the default bearer of the Internet PDN.

Figure 2B:
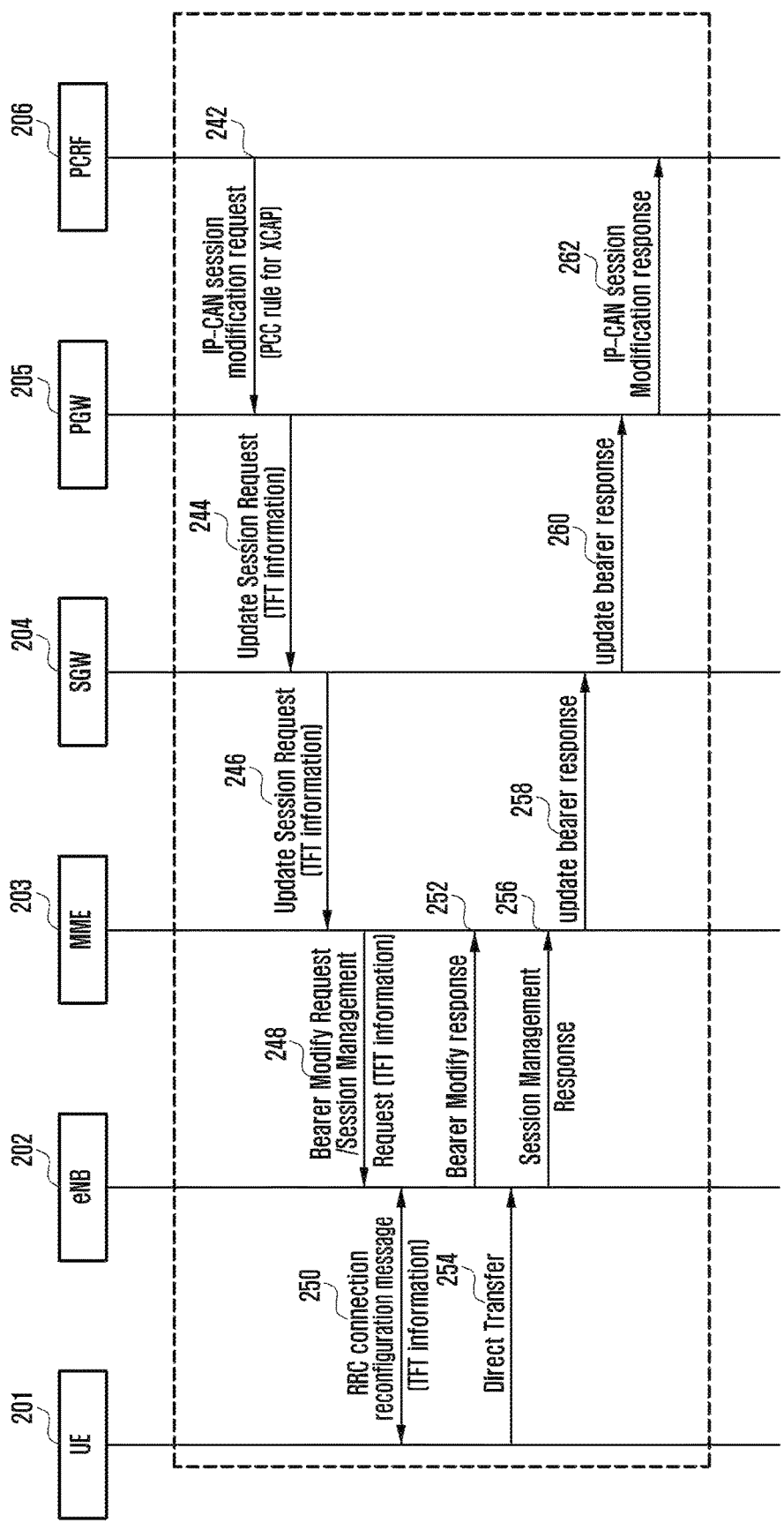
FIG. 2b is a signal flow diagram illustrating a TFT transmission procedure according to an embodiment.

FIG. 2a is a signal flow diagram illustrating a bearer establishment procedure between the UE and the PCRF 150 according to an embodiment, and FIG. 2b is a signal flow diagram illustrating a TFT transmission procedure according to an embodiment.

Referring to FIGS. 2a and 2b, if the roaming VoLTE UE requests for connection to the Internet PDN, the network generates a packet filter for allowing only the XCAP connection on the Internet PDN according to the subscription information of the terminal or the operator policy and installs the packet filter on the UE and the network itself. In an embodiment, the above procedure can be performed through signal exchanges among User Equipment (UE) 201, evolved Node B (eNB) 202, Mobility Management Entity (MME) 203, Serving Gateway (SGW) 204, Packet Data Network Gateway (PGW) 205, and Policy and Charging Rules Function (PCRF) 206.

The UE 201 sends the MME 203 a PDN connectivity Request message for Internet PDN connection at step 210. If the UE 201 has an XCAP server address, the UE transmits the XCAP server address in PCO. This transmission process may be performed by means of the eNB 202 and, although the description is directed to the case that the message type is PDN connectivity Request in this embodiment, the message is not limited thereto but can be replaced by any message for Internet PDN connection. In an embodiment, even when it determines that it is in the roaming state, the UE 201 may transmit the PDN connectivity Request message. This procedure is not limited to the roaming stated but applicable when the terminal connects to the home network.

At step 212, the MME 203 checks the subscription information of the UE 201 or operator policy based on the message at step 210.

In an embodiment, if the UE 201 is in the roaming state and is subscribed to only the voice call roaming or is the UE roaming according to the operator policy, the MME 203 may check whether the UE allows only the voice call roaming. The MME 203 may determine whether to allow only the XCAP connection to the Internet PDN depending on the check result. If the UE 201 is not allowed to connect to the Internet PDN, the MME 203 sends the UE 201 a Reject message in response to the PDN connectivity Request message. If the UE is allowed to connect the Interned PDN, the MME 203 performs step 214. In an embodiment, the MME 203 may store at least one of XCAP allowance/reject and XCAP server address in the UE context based on the message received at step 210.

The MME 203 sends the SGW 204 a Create Session Request message at step 214.

In the case that only the XCAP connection is allowed for the Internet PDN, the Create Session Request message may include an 'XCAP indication' field proposed in the embodiment. The 'XCAP indication' may include the information indicating that only the XCAP server connection is allowed for the Internet PDN requested by the UE 201. If the terminal has no XCAP server address at step 210, the MME 203 may include the subscription information or the XCAP server address set by the operation in the Creation Session Request message. The SGW 204 may include at least one of XCAP allowance/reject and XCAP server address in the UE context based on the received Create Session Request message.

At step 216, the SGW 204 forwards the Create Session Request message received at step 214 to the PGW 205. The PGW stores the XCAP allowance/reject and/or XCAP server address in the UE context based on the received message.

The PGW 205 sends the PCRF 206 an IP-CAN session establishment message at step 218. In an embodiment, the IP-CAN session establishment request message may include 'XCAP indication' and 'XCAP server address. The PCRF 206 may manage the policy to be applied to the UE and generate PCC rule. The PCRF 206 may store the XCAP allowance/reject and/or XCAP server address in the UE context based on the received IP-CAN session establishment request message.

At step 220, the PCRF 206 may check the XCAP connection-only allowance for Internet PDN connection for the UE 201 based at least one of the information received at step 218 and the information received from the HSS and store the information in the UE context for use in generating the PCC rule.

The PCRF 206 sends the PGW 205 an IP-CAN session establishment response message at step 222.

The PGW 205 sends the SGW 204 a Create Session Response message at step 224, and the SGW 204 forwards the message to the MME 203 at step 226.

At step 228, the MME 203 sends the eNB 202 a Bearer Setup Request/PDN connection Accept message generated based on the message received at step 226.

At step 230, the UE 201 and the eNB 202 perform RRC connection reconfiguration based on the message transmitted at step 228.

The eNB sends the MME 203 a Bearer setup response message related to the bearer establishment at step 232.

The UE 201 may perform Direct Transfer to the eNB 202 at step 234.

The eNB 202 sends the MME 203 a PDN Connectivity Complete message at step 236.

At step 238, the MME 203 sends the SGW a Modify bearer request message generated based on the message received at step 236.

At step 240, the SGW 204 sends the MME 203 a Modify bearer response message based on the message received at step 238.

After completing step 240, the UE 201 may generate a default EPS bearer for Internet PDN connection. The default EPS bearer is an EPS bearer carrying most data of the corresponding PDN connection such as non-Guaranteed Bit Rate (non-GBR) bearer.

Afterward, the network entities including the UE may perform the procedure of FIG. 2b for installing TFT related to the packet filter.

The PCRF 206 determines the necessity of restriction of the UE access to the Internet PDN at step 242. The restriction necessity may be determined by the PCRF 206 based on the received message after the receipt of the message at step 218 of FIG. 2a. The PCRF 206 determined to allow only the XCAP connection of the UE to the Internet PDN and sends the PGW 205 an IP-CAN session Modification request message. In an embodiment, the IP-CAN session Modification request message may be transmitted to the PGW 205 after transmitting the message of step 222 of FIG. 2a.

In an embodiment, the IP-CAN session Modification Request message may include the information indicating that the UE 201 is allowed only for the XCAP connection to the Internet PDN, and the information may include a PCC rule allowing only the XCAP connection.

At step 244, the PGW 205 sends the SGW 204 an Update Session Request message generated based on the message received at step 242. The Updated Session Request message may include the packet filter generated by the PGW 205 on the basis of the PCC rule received at step 222. The PGW 205 may install the packet filter on the default EPS bearer according to the information included in the PCC rule or the UE context stored at step 216 or 218. In an embodiment, the default EPS bearer may be a default EPS bearer generated through steps 210 to 240. In an embodiment, the packet filter may be included in the Update Session Request message in the form of Traffic Flow Template (TFT). According to an embodiment, the PGW 205 may install the packet filter based on the message received at step 242. Once the packet filter is installed, if the packet addressed to the UE 201 is transmitted elsewhere other than to the XCAP server, the packet may be dropped or not be delivered to the UE according to the packet filter.

The SGW 204 forwards the Update Session Request message to the MME at step 246.

The MME 203 sends the eNB 202 a Bearer Modify Request/Session Management Request message at step 248. The Bearer Modify Request/Session Management Request message may include TFT-related information received at step 246.

The eNB 202 sends the UE 201 the TFT-related information through RRC signaling at step 250. According to an embodiment the TFT-related information may be delivered to the UE 201 through the RRC Connection reconfiguration message. The UE 201 may install the packet filter based on the TFT-related information.

The rest of the IP-CAN session modification procedure may be performed at steps 252 to 262.

The eNB 202 sends the MME a Bearer Modify response message at step 252.

The eNB 202 performs Direct Transfer to the UE 201 at step 254.

At step 256, the eNB 202 sends the MME 203 a Session Management Response message generated based on the signal received at step 254.

At step 258, the MME sends the SGW 204 an update bearer response message generated based on the message received at step 256.

At step 260, the SGW 204 sends the PGW 205 an update bearer response message generated based on the message received at step 258.

At step 262, the PGW 205 sends the PCRF 206 a session Modification response message generated based on the message received at step 260.

According to an embodiment, if step 242 is performed right after step 222 such that a message for IP-CAN session modification procedure, i.e. EPS Bearer Modification procedure, is received before the eNB 202, MME 203, and SGW 204 complete establishment of a default EPS bearer, the eNB 202, MME 203, and SGW 204 may process the received message after the default EPS bearer establishment procedure completes.

Afterward, the UE 201 or an application of the UE 201 may request for connection to an Internet PDN other than XCAP server address as follows.

In the case that the UE 201 or the application of the UE 201 requests for data transmission through default EPS bearer, the packet filter installed as described with reference to the procedures of FIGS. 2a and 2b blocks the packets with the exception of the data addressed to the XCAP server.

If the UE 201 or the application of the UE 201 requests for dedicated EPS bearer establishment for data transmission, the PCRF 206 or PGW 205 may reject the request by referencing the context of the UE 201.

Table 2 shows the Create Session Request message including 'XCAP indication' proposed in an embodiment which is transmitted at step 214 of FIG. 2a according to an embodiment of the present invention.

TABLE 2

| Information elements | P | IE Type |
|---|---|---|
| IMSI | C | IMSI |
| MSISDN | C | MSISDN |
| ME Identity (MEI) | C CO | MEI |
| User Location Information (ULI) | C CO CO | ULI |
| Serving Network | C CO | Serving Network |
| RAT Type | M | RAT Type |
| Indication Flags | C | Indication |
| Sender F-TEID for Control Plane | M | F-TEID |
| PGW S5/S8 Address for Control Plane or PMIP | C | F-TEID |
| Access Point Name (APN) | M | APN |
| XCAP indication | C | XCAP |
| Selection Mode | C CO | Selection Mode |
| PDN Type | C | PDN Type |
| PDN Address Allocation (PAA) | C CO | PAA |
| Maximum APN Restriction | C | APN Restriction |
| Aggregate Maximum Bit Rate (APN-AMBR) | C | AMBR |
| Linked EPS Bearer ID | C | EBI |
| Protocol Configuration Options (PCO) | C | PCO |
| Bearer Contexts to be created | M | Bearer Context |
| Bearer Contexts to be removed | C | Bearer Context |
| Trace Information | C | Trace Information |
| Recovery | C | Recovery |
| MME-FQ-CSID | C | FQ-CSID |
| SGW-FQ-CSID | C | FQ-CSID |
| ePDG-FQ-CSID | C | FQ-CSID |
| TWAN-FQ-CSID | C | FQ-CSID |
| UE Time Zone | CO C | UE Time Zone |
| User CSG Information (UCI) | CO | UCI |
| Charging Characteristics | C | Charging Characteristics |
| MME/S4-SGSN LDN | O | Local Distinguished Name (LDN) |
| SGW LDN | O | Local Distinguished Name (LDN) |
| ePDG LDN | O | Local Distinguished Name (LDN) |
| TWAN LDN | O | Local Distinguished Name (LDN) |
| Signalling Priority Indication | CO | Signalling Priority Indication |
| Max MBR/APN-AMBR | CO | MMBR |
| UE Local IP Address | CO | IP Address |
| UE UDP Port | CO | Port Number |
| Additional Protocol Configuration Options (APCO) | CO O | Additional Protocol Configuration Options (APCO) |
| Private Extension | O | Private Extension |

The 'XCAP indication' proposed in the embodiment 1 may be implemented as an independent file or a new value of a legacy field such that the SGW 204, PGW 205, and PCRF 206 may perform subsequent operations based on the XCAP indication included in the message.

Figure 3:
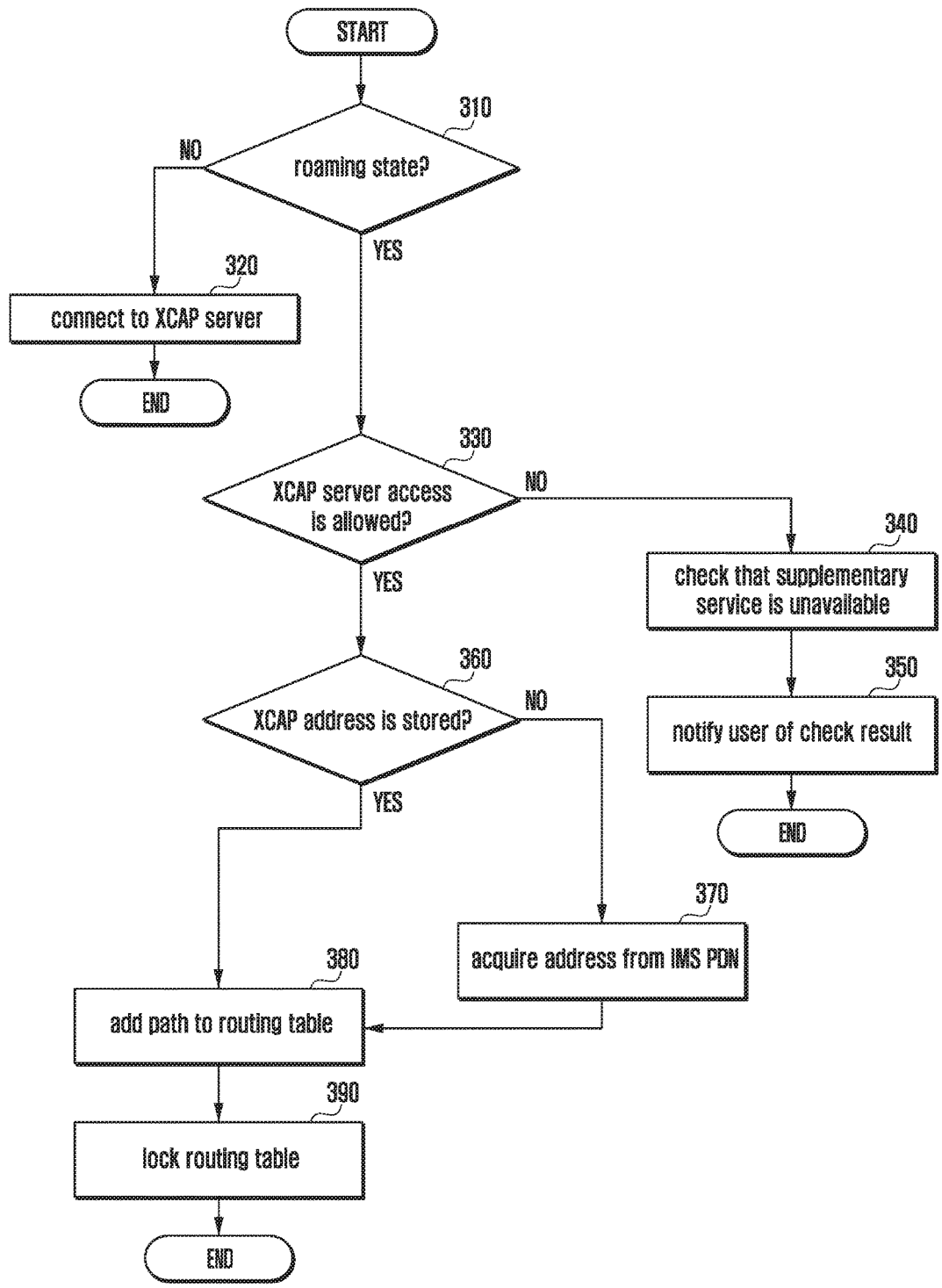
FIG. 3 is a flowchart illustrating a method for transmitting/receiving XCAP message according to another embodiment of the present invention.

FIG. 3 is a flowchart illustrating a method for transmitting/receiving XCAP message according to another embodiment of the present invention.

Referring to FIG. 3, the UE in the roaming state generates a routing table dedicated for the XCAP server access to block the packets addressed to other entities than the XCAP server so as to allow only the XCAP-related message exchange.

The UE may determine whether it is in the roaming state currently at step 310. If the UE is not in the roaming state, it may be assumed that the UE is connected to the home network. In this case, the UE connects to the XCAP server to transmit/receive XCAP-related messages at step 320.

If it is determined that the UE is in the roaming state at step 310, the UE determines whether it is allowed for XCAP server access at step 330. At step 330, the UE may determine whether it is allowed for access to the XCAP server based on the operator configuration stored in the USIM card or the user configuration to be described later with reference to FIG. 4.

If the UE is not allowed for access to the XCAP server at step 330, it checks that the service is unavailable due to the denial of access to the XCAP server at step 340. The UE notifies the user of the check result at step 350. The notification can be performed by displaying the reason of denial of access to the XCAP-related supplementary service on the display of the UE.

If it is determined that the UE is allowed for access to the XCAP server at step 330, the UE determines whether it has a previously stored XCAP server address at step 360. If no XCAP server address is stored, the UE acquires the XCAP server address from the IMS PDN at step 370.

If the XCAP server address is stored in the UE or acquired from the IMS PDN, the UE may add the XCAP server address to the TCP/IP routing table. The routing table includes routing information for use in delivery of the TCP/IP packets transmitted by the UE.

The UE may lock the routing table including the routing information at step 390. By locking the routing table, it is possible to prevent other addresses (with the exception of the XCAP server address) from being added to the routing table.

Through the above procedure, the UE or the application of the UE may handle the connection requests to the internet PDN with the exception of the XCAP server as follows. Since the address requested by the UE or the application of the UE does not exist in the routing information, the packet generated with such an address is dropped within the UE.

Figure 4A:
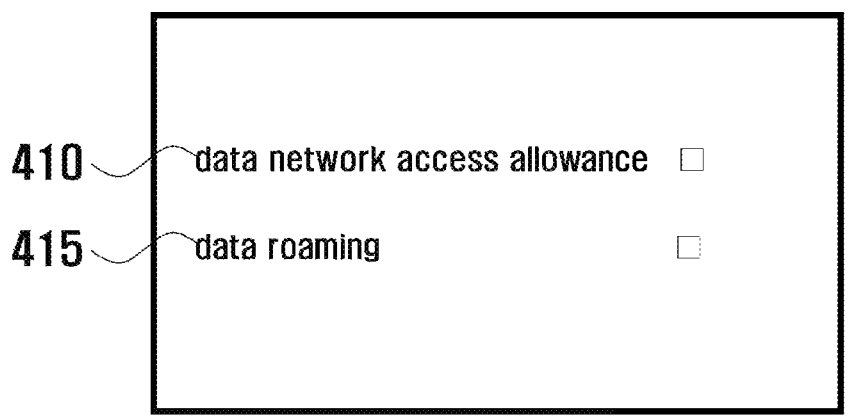
FIGS. 4a and 4b are diagrams illustrating exemplary screen displays network usage options selectable by the user in the roaming UE according to an embodiment of the present invention.
Figure 4B:
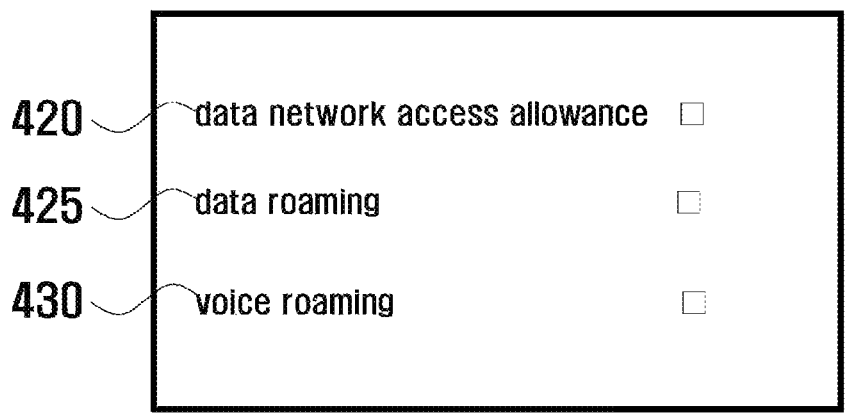

FIGS. 4*a* and 4*b* are diagram illustrating exemplary screen displays network usage options selectable by the user in the roaming UE according to an embodiment of the present invention.

FIG. 4*a* shows an exemplary screen presenting the data use options configurable in the UE.

Referring to FIG. 4*a*, the 'data network access allowance' 410 is an option selectable for use of the packet network such as Internet access independently of the roaming state, and 'data roaming' 415 is an option selectable for allowance of data transmission in the roaming state.

In an embodiment, if the data roaming 415 is selected, the UE can perform data transmission without restriction unless any other restriction is configured. In this case, the voice roaming may be provided without selecting any option.

FIG. 4B shows an exemplary screen presenting the data use options including voice roaming option according to an embodiment of the present invention.

Referring to FIG. 4*b*, if the user of the UE selects 'voice roaming' 430, it is possible to access the data service, i.e. the XCAP server using the packet network according to an embodiment. If the 'data network access allowance' 420 and the 'data roaming' 425 are selected, it is possible for the UE to transmit data through the Internet PDN unless there is any other restriction.

Another embodiment of the present invention proposes a method for the roaming terminal to transmit the XCAP message to the home network through the IMS APN/PDN.

According to an embodiment, if the roaming UE cannot access the Internet APN/PDN, it may transmit the XCAP message to the IMS APN/PDN in a separate message. According to an embodiment, if the roaming UE cannot use the Internet APN/PDN, it may set a configuration related to transmission of the XCAP message in the INVITE message. In the case that the network connection state fulfils the above condition, the UE can transmit the XCAP message to the home network using the INVITE message. The UE also may transmit the XCAP message to the home network using the 'MESSAGE' message.

According to another embodiment of the present invention, the UE determines whether to transmit the XCAP message using at least one of the INVITE message and 'MESSAGE' message depending on the information transmitted by the network.

In an embodiment, the UE may transmit the XCAP message in the INVITE message only when the information instructing to include the XCAP message in the INVITE message or 'MESSAGE' message is received from the network.

FIG. 5 is a signal flow diagram illustrating a method of transmitting the information notifying of the delivery of the XCAP message through IMS APN/PDN in the IMS registration procedure of the roaming terminal according to an embodiment.

Referring to FIG. 5, the UE 501 and the Proxy Call Session Control Function (PCSCF) 502 are in the roaming network, and the Interrogating Call State Control Function (ICSCF) 503, Home Subscriber Server (HSS) 505, and XCAP server 506 are in the home network.

The UE 501 sends the PCSCF 502 a REGISTER message at step 510. According to an embodiment, the terminal 501 may transmit the REGISTER message to receive an XCAP message.

At step 515, the PCSCF 502 forwards the REGISTER message received at step 510 to the ICSCF 503.

The ICSCF 503 forwards the REGISTER message to the SCSCF 504 at step 520. The REGISTER message delivery at steps 510 to 520 is performed as specified in the standard.

The SCSCF 504 requests the HSS 505 for the subscription information of the UE 501 at step 525. At step 530, the HSS 505 sends the SCSCF 504 the subscription information of the UE 501 in response to the message received at step 525.

According to an embodiment of the present invention, the subscription information messages exchanged at step 525 and 530 may include the information indicating that an XCAP-related message is included in the INVITE message or 'MESSAGE' message when the UE 501 is in the roaming state. According to an embodiment, the XCAP message inclusion indication may be included in the form of 'the UE will use the INVITE for XCAP transmission.'

The SCSCF 504 sends the ICSCF 503 a 200OK message in response to the REGISTER message at step 535.

The ICSCF 503 forwards the 200OK message to the PCSCF 502 in response to the REGISTER message at step 540.

The PCSCF 502 forwards the 200OK message to the UE 501 in response to the REGISTER message at step 545. According to an embodiment, the 200OK message delivery at steps 535 to 545 may be performed as specified in the standard.

The SCSCF 504 performs filter criteria evaluation at step 550. In an embodiment, the SCSCF 504 may check whether to register the UE 501 with the XCAP server 506 based on the information exchanged at steps 525 and 530. If it is determined not to register, the subsequent steps are skipped to operate as usual.

The SCSCF 504 registers the UE 501 with the XCAP server 506 at step 555. For this purpose, the REGISTER message may be transmitted to the XCAP server 506.

The XCAP server 506 sends the SCSCF 504 the 200OK message at step 560 after performing registration according to the REGISTER message.

According to an embodiment, step 555 may be performed after step 530 or at the same time as step 535.

Through the above procedure, the XCAP server 506 of the home network is aware that the UE 501 transmits the XCAP message through at least one of the INVITE message and 'MESSAGE' message.

Figure 6:
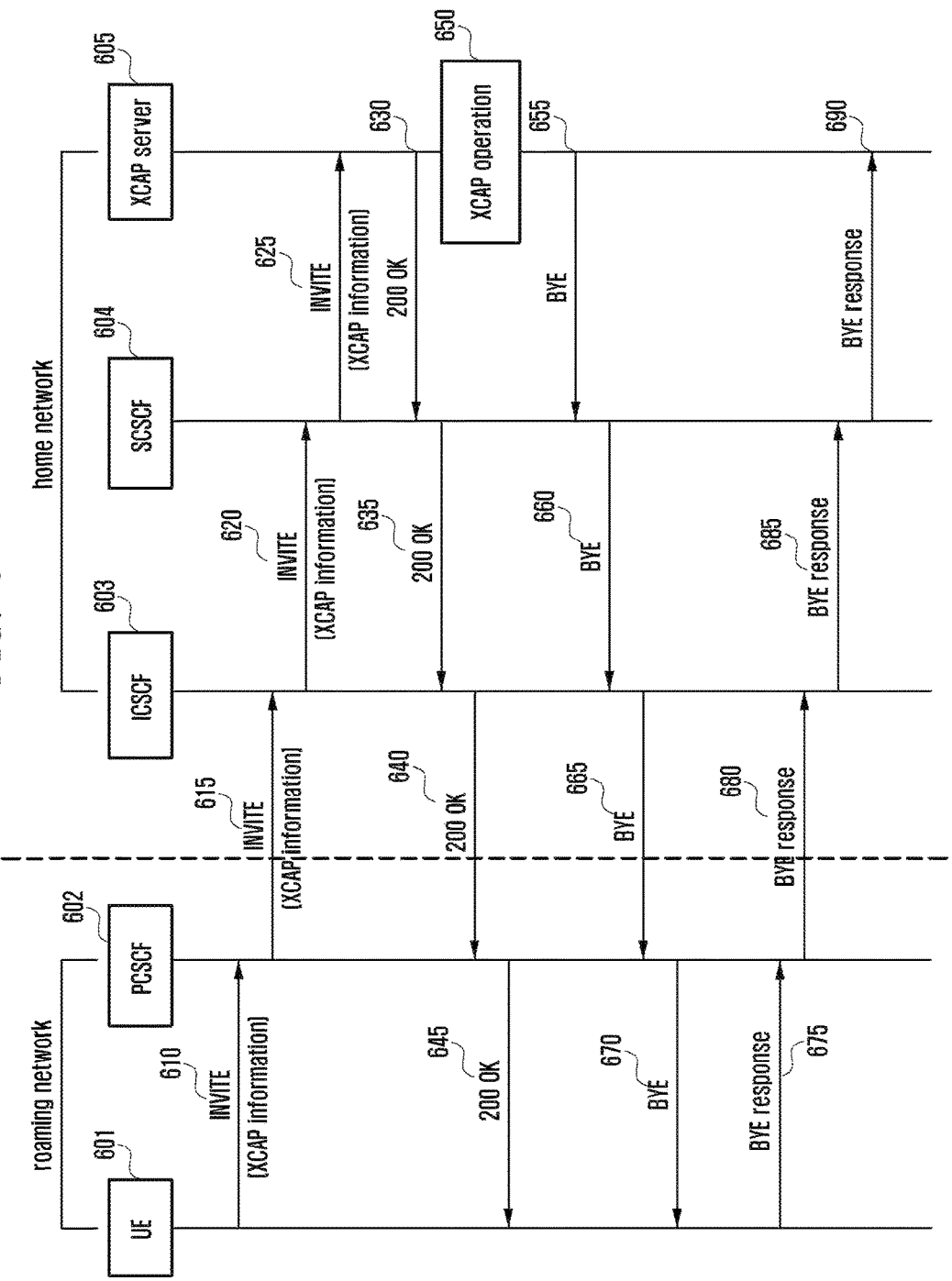
FIG. 6 is a signal flow diagram illustrating a method for the roaming UE to transmit the XCAP message in the INVITE message according to an embodiment of the present invention.

FIG. 6 is a signal flow diagram illustrating a method for the roaming UE to transmit the XCAP message in the INVITE message according to an embodiment of the present invention.

In FIG. 6, the UE 601 and the PCSCF 602 are in the roaming network, and the ICSCF 603, SCSCF 604, and XCAP server 605 are in the home network. Although the drawing is directed to the case where the PCSCF 602, ICSCF 603, and SCSCF 604 are exemplified as relaying entities, the relaying entities may be changed depending on the network structure such that the UE 601 may send the XCAP server 650 the XCAP-related message based on the configurations of the changed relay entities.

In an embodiment, the UE 601 sends the PCSCF 602 the INVITE message at step 610. The INVITE message may include the XCAP information. In an embodiment, if the UE 601 in the roaming state cannot use the Internet APN/PDN based on at least one of the configuration in the UE 601 and the operator configuration, the XCAP message may be transmitted to the PCSCF 602 using the INVITE message. The structure of the INVITE message is described later.

At step 615, the PCSCF 602 forwards the INVITE message received at step 610 to the ICSCF 603.

At step 620, the ICSCF 603 forwards the INVITE message received at step 615 to the SCSCF 604.

At step 625, the SCSCF 604 forwards the INVITE message received at step 620 to the XCAP server.

At step 630, the XCAP server 605 sends the SCSCF 604 the 200OK message in response to the message received at step 625.

At step 635, the SCSCF 604 forwards the 200OK message received at step 630 to the ICSCF 603.

At step 640, the ICSCF 603 forwards the 200OK message received at step 635 to the PCSCF 602.

At step 645, the PCSCF 602 forwards the 200OK message received at step 640 to the UE 601.

At step 650, the XCAP server 605 performs the operations indicated in the XCAP message received at step 625.

In an embodiment, if additional information is required, the XCAP server 605 may request the UE 601 for the information. The operation of step 650 may be performed between steps 615 and 630. In this case, the 200OK message transmitted at step 630 may include the information determined by the XCAP server based on the XCAP-related information included in the INVITE message received at step 625.

At step 655, the XCAP server 605 sends the SCSCF 604 a BYE message for completing the XCAP-related operation and ends the session. According to an embodiment, the BYE message may include a value determined based on the XCAP-related information received from the UE 601. According to an embodiment, the XCAP-related information may include the information of the network for call forwarding, and the value included in the BYE message may be the information indicating that the call forwarding has been performed successfully. The BYE message also may include a value of requesting for the XCAP-related information. In an embodiment, if it is necessary to report the XCAP message processing result to the UE 601, the XCAP server 605 includes the processing result information in the BYE message.

At step 660, the SCSCF 604 forwards the BYE message received at step 655 to the ICSCF 603.

At step 665, the ICSCF 603 forwards the BYE message received at step 660 to the PCSCF 602.

At step 670, the PCSCF 602 forwards the BYE message received at step 665 to the UE 601.

At step 675, the UE 601 sends the PCSCF 602 a response message in response to the BYE message received at step 670. At step 680, the PCSCF 602 forwards the BYE response message received at step 675 to the ICSCF 603.

At step 685, the ICSCF 603 forwards the BYE response message received at step 680 to the SCSCF 604.

At step 690, the SCSCF 604 forwards the BYE response message received at step 685 to the XCAP server 605. Through this message transmission procedure, it is possible to end the session established through the INVITE message.

Although the description is directed to the case where the UE 601 transmits XCAP-related information to the XCAP server 605 using the INVITE message, the present invention is not limited thereto but embodied by transmitting the XCAP-related information in the 'MESSAGE' message.

According to an embodiment, the 200OK message transmitted at step 535 of FIG. 5 may include the information instructing the UE 501 to transmit the XCAP message in the INVITE message. The 200OK message may carry the content determined by the SCSCF 504 or HSS 505. Upon receipt of the message, the UE 501 operates according to the procedure of FIG. 6 when it is necessary to connect to the XCAP server.

FIG. 7 is a diagram illustrating a format of the INVITE message according to an embodiment.

Although the description is directed to the INVITE message as an example, the 'MESSAGE' message can be modified to be in a similar format to the INVITE message so as to include the XCAP-related information.

Referring to FIG. 7, server sip uri 710 and 720 informs that the recipient of the INVITE message is the XCAP server.

application/vnd.3gpp.xcap 730 and 750 informs that an XCAP message is included in the payload of the INVITE message.

g.3gpp.xcap 740 informs that the INFO package supported by the UE is a type related to XCAP.

<XCAP MESSAGE> 760 may include the content related to the XCAP message.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A data communication method of a mobility management entity (MME) of a mobile communication system, the method comprising:
 receiving a message including an XML configuration access protocol (XCAP) address corresponding to an XCAP server among at least two servers included in an internet packet data network (PDN) from a terminal in a roaming network of the mobile communication system for connecting only to the XCAP server;
 checking at least one of subscription information of the terminal and network operator policy based on the received message; and
 transmitting, when the terminal is allowed to access the XCAP server of the internet PDN as a result of the checking, a create session request message generated based on the received message to a gateway,
 wherein the create session request message includes the XCAP address and an indicator indicating that the terminal is allowed to connect only to the XCAP server corresponding to the XCAP address of the at least two servers included in the internet PDN.

2. The method of claim 1, further comprising receiving a session update request message from the gateway, wherein the session update request message includes a traffic flow template (TFT) having at least one packet filter which passes only packets addressed to the XCAP server.

3. The method of claim 2, wherein the packet filter is generated according to a policy and charging control (PCC) rule determined by a policy charging and rules function (PCRF) and installed in a PDN gateway (PGW) and the terminal.

4. A data communication method of a terminal of a mobile communication system, the method comprising:
 transmitting, by the terminal in a roaming network of the mobile communication system, to a mobility management entity (MME) a message including an XML configuration access protocol (XCAP) address corresponding to an XCAP server among at least two servers included in an internet packet data network (PDN) for connecting only to the XCAP server; and
 performing RRC connection reconfiguration with a base station based on the message,
 wherein the MME checks at least one of subscription information of the terminal and network operator policy based on the message transmitted to the MME and transmits, when the terminal is allowed to access the XCAP server of the internet PDN as a result of the checking, a create session request message generated based on the message transmitted to the MME to a gateway, the create session request message including the XCAP address and an indicator indicating that the terminal is allowed to connect only to the XCAP server corresponding to the XCAP address of the at least two servers included in the internet PDN.

5. The method of claim 4, wherein the performing of the RRC connection reconfiguration comprises:
 receiving a traffic flow template (TFT) including at least one packet filter generated based on the message, the packet filter passing only packets addressed to the XCAP server.

6. The method of claim 5, wherein the packet filter is generated according to a policy and charging control (PCC) rule determined by a policy charging and rules function (PCRF) and installed in a PDN gateway (PGW) and the terminal.

* * * * *